(12) United States Patent
Cotter

(10) Patent No.: US 7,043,164 B1
(45) Date of Patent: May 9, 2006

(54) OPTICAL REGENERATOR FOR HIGH BIT-RATE OTDM SIGNALS

(75) Inventor: David Cotter, Woodbridge (GB)

(73) Assignee: British Telecommunications public limited company, London (GB)

( * ) Notice: Subject to any disclaimer, the term of this patent is extended or adjusted under 35 U.S.C. 154(b) by 522 days.

(21) Appl. No.: 10/019,080

(22) PCT Filed: Jul. 19, 2000

(86) PCT No.: PCT/GB00/02780

§ 371 (c)(1),
(2), (4) Date: Dec. 26, 2001

(87) PCT Pub. No.: WO01/08332

PCT Pub. Date: Feb. 1, 2001

(30) Foreign Application Priority Data

Jul. 23, 1999 (EP) .................................. 99305834

(51) Int. Cl.
*H04B 10/00* (2006.01)
(52) U.S. Cl. ...................................... 398/175; 398/176
(58) Field of Classification Search .......... 398/79–103, 398/173–181; 385/15
See application file for complete search history.

(56) References Cited

U.S. PATENT DOCUMENTS

| | | | | |
|---|---|---|---|---|
| 5,309,267 A | * | 5/1994 | Huang | 398/155 |
| 5,841,560 A | * | 11/1998 | Prucnal | 398/101 |
| 6,556,322 B1 | * | 4/2003 | Desurvire | 398/98 |

FOREIGN PATENT DOCUMENTS

EP 1197015 B1 8/2004

OTHER PUBLICATIONS

EPO Examination Report dated Jul 23, 1003.
EPO Examination Report dated Dec. 11, 2002.

* cited by examiner

*Primary Examiner*—Agustin Bello
(74) *Attorney, Agent, or Firm*—Nixon & Vanderhye P.C.

(57) ABSTRACT

An optical regenerator suitable for use with optical signals has two stages. An incoming optical signal to be regenerated passes first through a data division stage. This divides the optical data stream into a number of data streams at a bit rate lower than the original optical signal. These data streams then pass to a regeneration stage. In the regeneration stage, there are a number of optical gates. Each gate receives one of the optical data streams at its control input. An optical clock stream at the lower or at a multiple thereof passes through the optical gates. The outputs of these optical gates are connected in common to the optical output of the regenerator and provide a bit-interleaved regenerated optical data stream at the output.

15 Claims, 4 Drawing Sheets

OPTICAL REGENERATOR FOR HIGH BIT-RATE OTDM SIGNALS

BACKGROUND OF THE INVENTION

1. Field of the Invention

The present invention relates to an optical regenerator suitable for use with optical time division multiplexed (OTDM) signals carried on an optical network. The signals may be, for example, optical packets or a circuit switched data stream.

2. Related Art

In order to use fully the bandwidth available on optical communications networks, it is desirable to transmit time division multiplexed signals at a very high bit rate of tens or hundreds of Gbits per second. However, the very short duration pulses making up such signals soon suffer degradation in shape, timing and signal-to-noise ratio resulting, for example, from noise in optical amplifiers, dispersion in the optical transmission medium and/or from the effects of processing at nodes traversed by the packet. Therefore, if the extent of the optical network is not to be undesirably limited, it is necessary to use an optical regenerator to restore the timing and shape of the pulse train making up the optical signals. Ideally, the regenerator will function as a "3R" regenerator, that is it will re-amplify, re-time and re-shape the pulses. Examples of suitable optical regenerators are described in Lucek J and Smith K, Optics Letters, 18, 1226–28 (1993), and in Phillips I D, Ellis A D, Thiele H J, Manning R J and Kelly A E, Electronics Letters, 34, 2340–2342 (1998). The use of such techniques makes it possible to maintain the integrity of the optical data signals as they pass through a very large number of nodes. For example, Thiele H J, Ellis A D and Phillips I D, Electronics Letters, 35, 230–231 (1999) describe cascaded 40 Gbit/s 3R data regeneration in a recirculating loop. With a regenerator spacing of 100 km, the error-free transmission distance in the loop is extended by an order of magnitude, from 200 km to greater than 2000 km. Regenerators made from semiconductor non-linear optical devices, rather than fibre non-linear optical devices, are preferred because they are compact, stable, easily integrated, and operate at relatively low pulse energy.

Typically, an optical regenerator comprises an optical gate having a first optical input that receives an optical clock signal at the data line rate, and a second optical input, the control input that receives the data signal that is to be regenerated. Typically the gate, which includes a non-linear optical element, changes to a transmissive state when a binary digit '1' occurs in the optical control signal that is applied, and reverts to the original non-transmissive state after a certain fixed time known as the gate window. The state of the gate is unchanged if a binary digit '0' occurs in the optical control signal. The state of the non-linear element then determines whether a given-pulse in the optical clock train at the input to the gate is passed on to the output from the gate. In this way, the bit pattern in the input data stream is imposed on the optical clock train and output to form a regenerated optical data stream. However, while experiments reported in Kelly A E et al, Heatronics Letters, (in press, July 1999) have shown that semiconductor-based all-optical regenerators can function at bit rates as high as 80 Gbit/s it has been found that they are unable to perform satisfactorily at still higher bit rates, since then in general the bit period is very much less than the recovery time of the optical gate, so that the regenerated signals contain patterning effects which lead to bit errors.

BRIEF SUMMARY

According to a first aspect of the present invention, there is provided an optical regenerator including: (a) a data division stage arranged to receive an incoming optical data stream having a bit rate and to divide the incoming optical data stream into a plurality of further optical data streams each having a lower bit rate than the bit rate of the incoming data stream; and, b) a regeneration stage, including a plurality of optical gate means each arranged to receive a respective one of the further data streams at its control input and to receive at another input an optical clock stream at the frequency of the bit rate of the further data streams or a multiple thereof, wherein the outputs of the gate means are connected in common to an optical output (5) of the regenerator and arranged to provide a bit interleaved regenerated optical data stream at the said output.

The present invention provides an all-optical generator that is able to function at far higher bit rates than existing designs. For example, using current technologies, an all-optical regenerator functioning at 160 Gbit/s can be constructed. The present inventors have realised that although the functioning of an optical regenerator is limited by the recovery time of the optical gate, the impact of that recovery time is different for a regular clock signal, as opposed to a signal comprising a random data sequence. Accordingly, a gate that may be able to function effectively as a regenerator for data signals only up to 80 Gbit/s can nonetheless function as a demultiplexer for data signals at twice that bit rate. The regenerator of the present invention takes advantage of this difference to provide a system capable of operating at far higher bit rates. This is achieved by first dividing down the higher bit rate data stream into a number of parallel data streams at a lower bit rate and then applying these different divided data streams at the lower bit rate as control signals to a number of gates, each of which is receiving a clock signal at the frequency of the lower bit rate or a multiple thereof at its input. Then when the outputs of the different gates are interleaved, the result is a regenerated data stream at the higher bit rate.

Preferably the data division stage comprises a plurality of gate means each arranged to receive the data stream at a respective driving input and a clock stream at the frequency of the lower bit rate at a respective control input and delay means arranged to impose a different respective delay in the clock signal at the frequency of the lower bit rate relative to the higher bit rate data signal for each of the respective gate means.

The all-optical regenerator may be arranged to function in a bit synchronous network, in which case it may receive clock signals from local clock sources that are synchronised to a bit-level clock. In such a system, each of the gate means may comprise a single optical gate, for example using a TOAD (teraHertz optical asymmetrical demultiplexer) structure.

Alternatively, the optical regenerator may be used in a network which functions asynchronously at the bit-level. In this case, the optical regenerator may incorporate the regenerator structures described and claimed in the present applicant's co-pending application PCT/GB99/01159. In this case, each of the gate means in the regeneration stage may comprise an array of optical gates, and delay means arranged to impose a different respective delay in the clock stream relative to the data stream at each of the array of optical gates, and an critical switch connected to the outputs of all of the array of optical gates, and arranged selectively to output the optical data stream from one of the gates of the array. Alternatively, as described in our co-pending application, a single gate means may be used in conjunction with means to shift the phase of the incoming packet to match that of a local free-running optical clock source.

According to a second aspect of the present invention, there is provided a.

A method of regenerating an optical data signal including:
a) dividing an incoming optical data signal at a bit rate into a plurality of further data streams each having a lower bit rate than the bit rate of the received optical signal;
(b) gating under the control of the plurality of further data streams a clock signal at the frequency of the bit rate of the further signals or a multiple thereof; and
interleaving the optical signals produced by step (b) thereby creating a re-generated optical signal at the bit rate of the received optical data signal.

BRIEF DESCRIPTION OF THE DRAWINGS

Systems embodying the present invention will now be described in further detail by way of example only, with reference to the accompanying drawings in which.

DETAILED DESCRIPTION OF EXEMPLARY EMBODIMENTS

Figure 1:
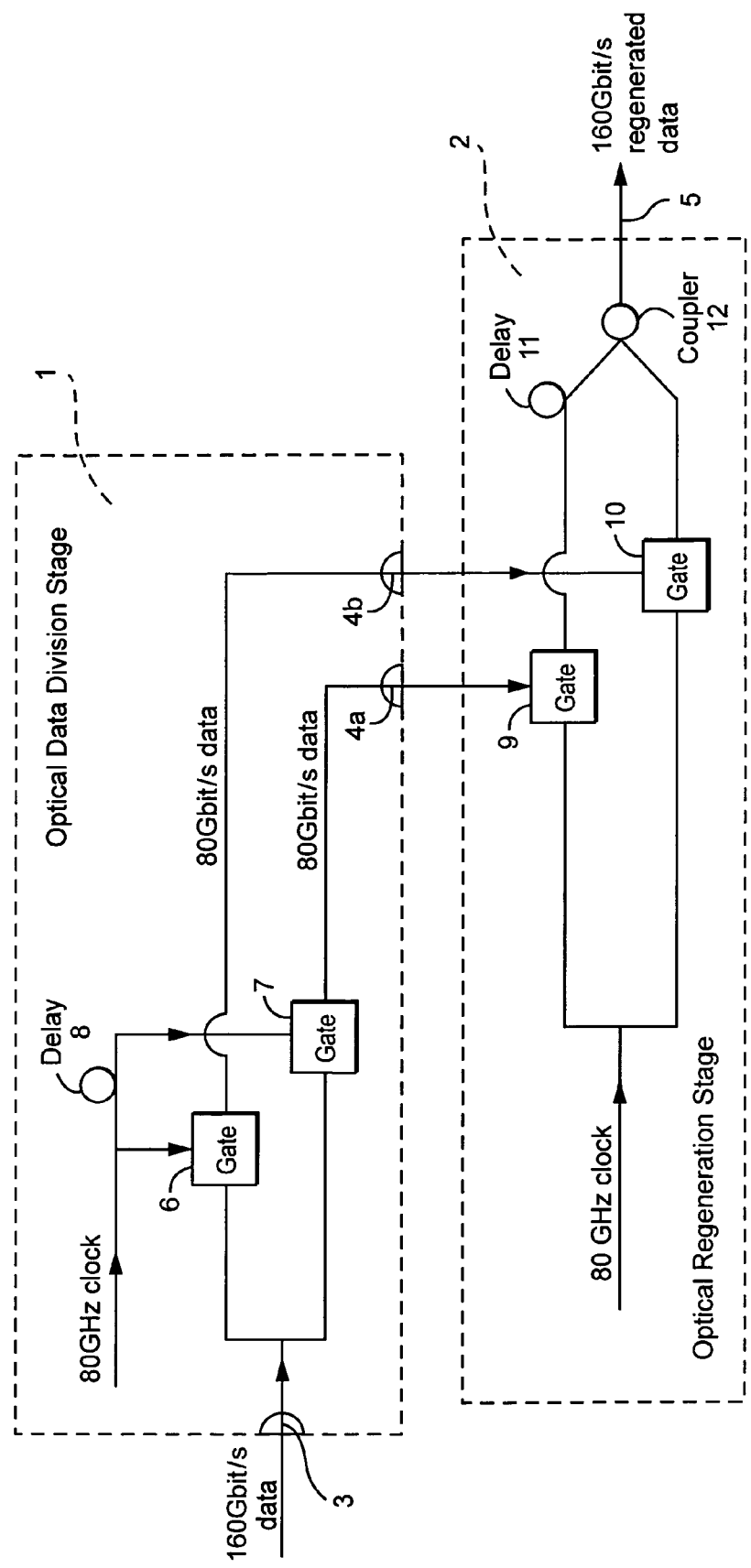
FIG. 1 is a schematic of an optical regenerator embodying the invention.

An optical regenerator comprises an optical data division stage 1 and an optical regeneration stage 2. An optical time division multiplexed (OTDM) data stream at a high bit rate, in this example 160 Gbit/s, is received at an optical input 3 of the data division stage 1. Divided data streams at a lower bit rate, in this example 80 Gbit/s are passed from optical outputs 4a, 4b of the data division stage 1 into the optical regeneration stage 2. The data streams are used to gate an optical clock signal at the frequency of the lower bit rate or a multiple thereof, in this example 80 GHz, so as to produce at the optical output 5 of the regeneration stage 2 a regenerated high bit-rate optical-data stream.

In a regenerator for use with a synchronous data steam, the data division and regeneration stages require in total 2n optical gates where n is the ratio between the bit rate of the optical data stream and the lower bit rate of the divided data streams input to the regeneration stage 2. In the present example, n=2 and there are two optical gates in the division stage 1 and a further two optical gates in the regeneration stage 2. As shown in FIG. 1, each of the two gates in the division stage 1 is connected in common to the optical input 3 and is driven by the 160 Gbit/s optical pulse stream. An optical clock signal at the lower bit rate of 80 GHz is applied to each of the optical gates 6, 7. An optical delay 8 is included between the optical feeds to the gates 6, 7. The magnitude of the optical delay is said to be equal to the separation between successive bits in the optical data stream at the input 3. As a result, the two optical gates 6, 7 each pass every other bit of the input data stream with, for example, gate 6 passing the optical pulses in bit positions 0, 2, 4 . . . and the other gate 7 passing the optical pulses in bit positions 1, 3, 5 . . . The resulting divided data streams at the lower bit rate are passed to the optical outputs 4a, 4b of the data division stage 1. In the regeneration stage 2, a further pair of optical gates 9, 10 are driven by the 80 GHz optical clock signal. A respective one of the divided data signals is applied as a control signal to each of the gates 9, 10. An optical delay 11 is included in the output from one of the gates 9, 10 and is arranged to impose a relative delay between the outputs of the gates 9, 10 that is complementary to the delay imposed in the data division stage 1. The outputs of the gates 9, 10 are then combined by an optical coupler 12. In this way, the two lower bit rate data streams are modulated onto the higher bit rate clock and interleaved to produce an output signal at 160 Gbit/s that is regenerated in shape, amplitude and timing, that is it has undergone 3R regeneration.

Figure 2:
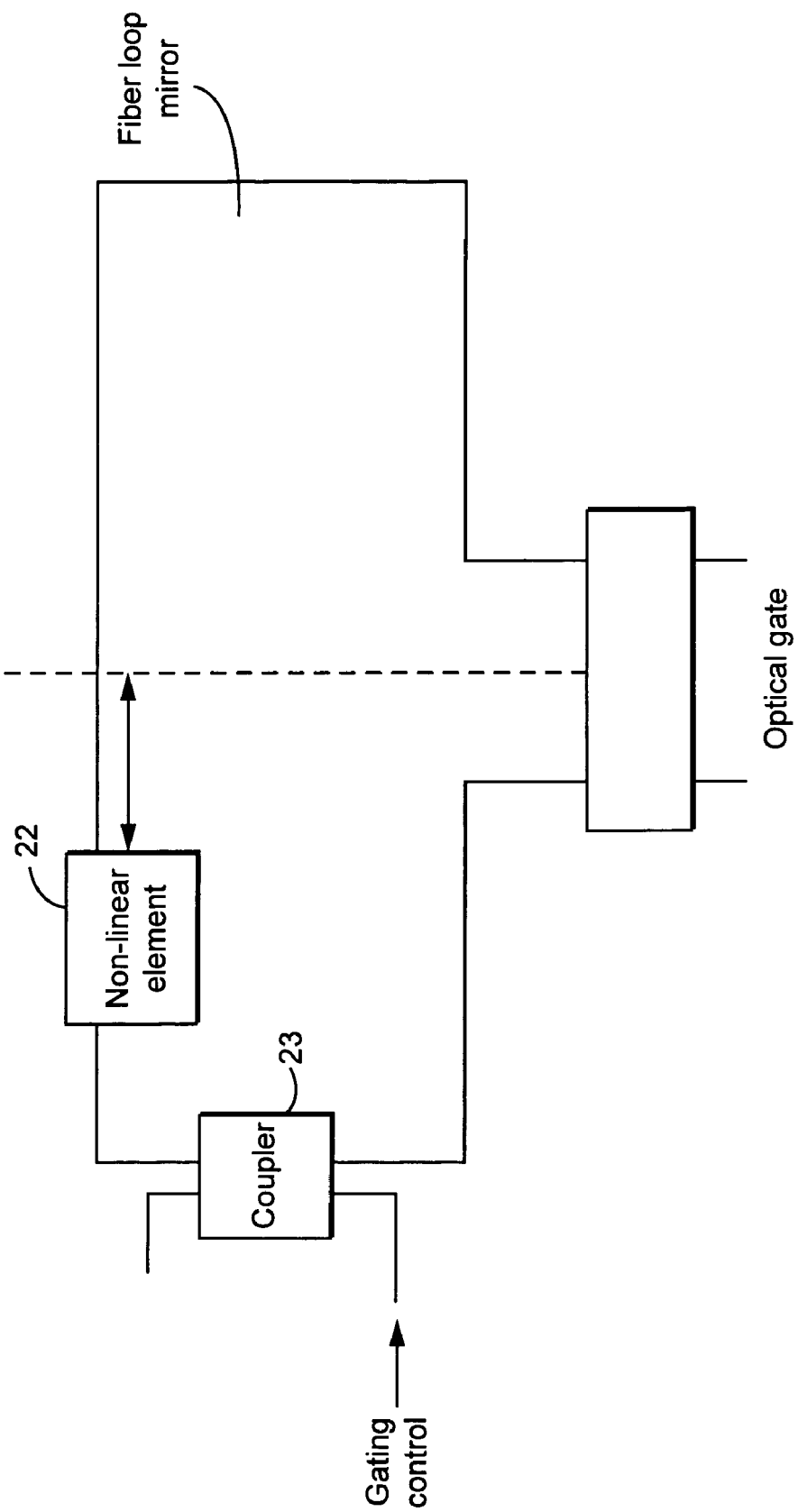
FIG. 2 is a diagram showing an optical gate suitable for use in the regenerator in FIG. 1.

FIG. 2 shows one possible construction for an optical gate for use in the circuit of FIG. 1. In this case, the gate uses a TOAD configuration. A fibre loop mirror 21 includes a non-linear element 22 which may be, for example, an optical semiconductor amplifier. The non-linear element 22 is offset with respect to the centre of the loop mirror. The duration of the switching window is determined by the extent of the offset. A gating control signal is applied to the loop via an optical coupler 23.

Fibre loop mirrors in which the fibre itself acts as the non-linear element are described, for example, in Whittaker et al, Optical Letters, vol. 16, page 1840 (1991). The use of non-linearities in semiconductor optical amplifiers as an ultrafast gating device is described, for example, by Kang et al in the International Journal of High Speed Electronics and Systems, vol. 7, page 125 (1996). As an alternative to the use of a semiconductor optical amplifier in a loop configuration as shown in FIG. 2, an optical gate may use a pair of amplifiers in a Mach-Zehnder interferometer configuration. Another ultrafast optical gate is the ultrafast non-linear interferometer switch described by Hall and Rauschenbach (Paper BD5, Proceedings of Conference on Optical Fibre Communications (OFC '98) Optical Society of America, February 1998). It is characteristic of all these devices, that they suffer significant speed limitations as a result of the recovery time of the non-linear element when the gate is driven by an irregular data signal. However, they can function at considerably higher data rates when driven by a regular clock signal.

To generate the clock signals at and the frequency of the lower bit rate, a clock recovery circuit may be used to derive a clock signal in synchronism with the incoming data bits and this clock signal may be used to synchronise a local pulse source running at 80 GHz. For example, the clock recovery circuit may comprise a passive pulse replication network that replicates a marker pulse to produce a regular pulse pattern.

Figure 3:
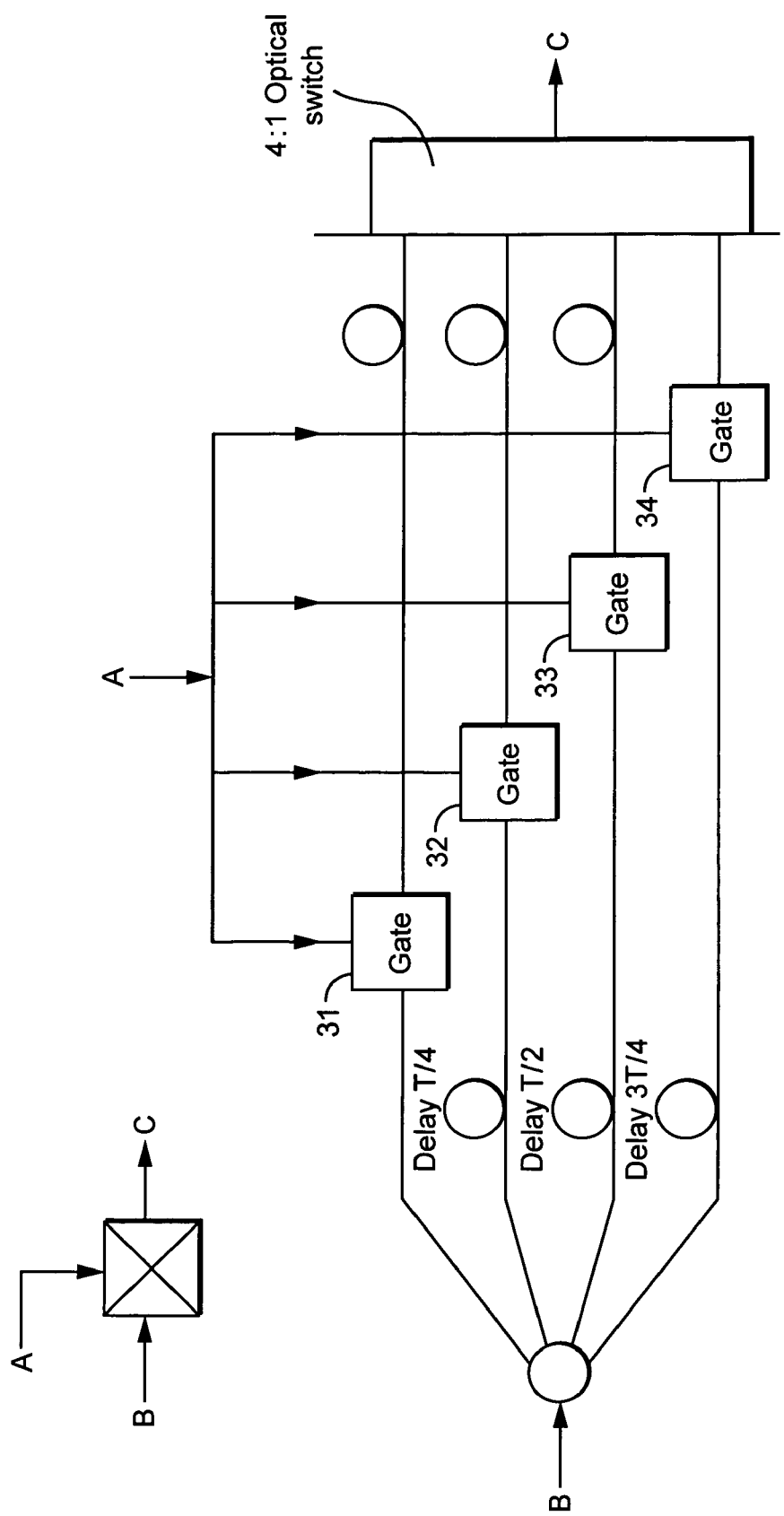
FIG. 3 is a diagram showing a gate array for use in the regenerating stage of an asynchronous optical regenerator embodying the invention.

In an alternative embodiment, the optical regenerator is arranged to handle incoming optical packets that are asynchronous at the bit-level. In this case, each of the single optical gates 9, 10 in the regenerative stage of FIG. 1 is replaced by an array of gates. One such array is shown in FIG. 3. The array comprises four optical gates 31, 32, 33, 34. Each of the gates is driven by the 160 Gbit/s data stream. Different relative delays of a fraction of a bit period are included in the input paths for the driving signals. This delay has a value of 0 for the input to the first optical gate 31 $\pi/4$ for the second optical gate 32, $\pi/2$ for the third optical gate 33, and $3\pi/4$ for the final optical gate 34. The outputs from the four optical gates are passed to a 4:1 optical switch which selects the data stream from one of the gates to be passed to the respective optical output 4a, 4b. The appropriately synchronised output may be selected, for example, by tapping off a fraction of the output from the switch C and measuring, for example using a photo detector, the optical energy in the data signal each of the different gates is selected. When the phase error between the clock signal and driving data signal is minimised, then the corresponding gate output will give a peak in the energy function. Electronic control logic may be used to generate an electronic control signal for the 4:1 switch. The lower switching rates of electronic control logic is not a limiting factor, since the selection of an optical output from the gate array only needs to be repeated at the packet rate. In such systems handling bit asynchronous optical packets, the optical clock signals may be derived from free-running optical pulse sources. A suitable source comprises an electronic microwave oscillator driving an electrically synchronised laser, such as a gain-switched laser or an actively mode-locked laser. Alternative, a continuously free-running optical pulse source such as a passively mode-locked laser may be used. In general, an asynchronous optical regenerator will require 5 n gates, where n is the ratio between the higher bit rate and the lower bit rate.

Figure 4:
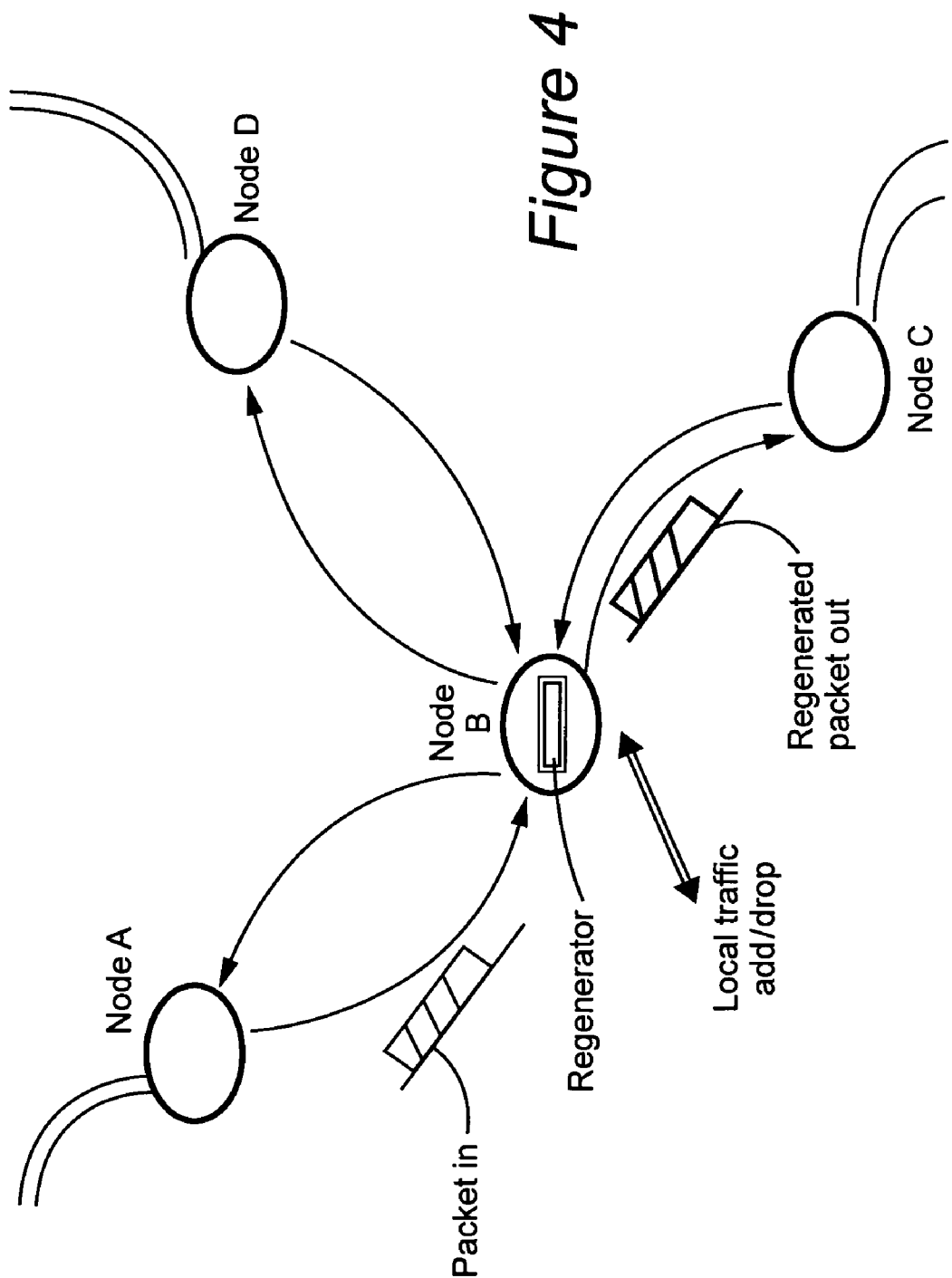

FIG. 4 shows, by way of example, an optical network in which a node includes a bit-asynchronous regenerator embodying the invention. Packets arrive at the node referenced B from a number of sources, each of which have independent, uncorrelated clocks. By suitable adjustment of the transmitted power at the source, the power levels in any optical amplifiers used in the link, and also the power levels at any synchronous regenerators used in the link, the bits in the packets arriving at the input of a routing node may conveniently have an intensity at an appropriately-defined standard 'digital' level (e.g. of the correct intensity to perform complete switching in the optical gate or gates used in the bit-asynchronous packet regenerator AR in the switching node). The inputs to the switching nodes will, in general, be bit-asynchronous. Each input to a routing node may pass through a bit-asynchronous packet regenerator AR, constructed as described above. As is shown schematically in FIG. 4 a node, such as that referenced node B, may combine an add/drop function for local traffic as well as regenerating packets for onward transmission.

What is claimed is:

1. An optical regenerator including:
   (a) a data division stage arranged to receive an incoming optical data stream having a bit rate and to divide the incoming optical data stream into a plurality of further optical data streams each having a lower bit rate than the bit rate of the incoming data stream; and
   (b) a regeneration stage, including a plurality of optical gate means each arranged to receive a respective one of the further data streams at its control input and to receive at another input an optical clock stream at the frequency of the bit rate of the further data streams or a multiple thereof, wherein the outputs of the gate means are connected in common to an optical output of the regenerator and arranged to provide a bit-interleaved regenerated optical data stream at the said output.

2. A regenerator according to claim 1, in which the data division stage includes a plurality of optical gate means each arranged to receive the incoming data stream at a respective data input and to receive at a respective control input an optical clock stream at the frequency of the bit rate of the further data streams and delay means arranged to impose a different respective delay on said optical clock stream relative to the incoming data signal for each of the respective gate means.

3. A regenerator according to claim 1, in which the regenerator is arranged to regenerate a received bit-asynchronous optical packet, and in which each of the gate means of the regeneration stage includes an array of optical gates, means for imposing different respective delays between the clock signal and the data signal at each of the gates making up the array and switch means for selecting an optical output from one of the gates in the array depending on the bit-level phase of the received optical packet.

4. A node for connection in an optical network and including a regenerator according to claim 1.

5. An optical network including a regenerator according to claim 1.

6. A node as in claim 4, further including an add/drop function for local traffic of the network.

7. An optical network including a node according to claim 4.

8. A regenerator as in claim 1, in which the incoming optical data stream has a bit rate of 160 Gbits$^{-1}$.

9. A node as in claim 4 in which the incoming optical data steram has a bit rate of 160 Gbits$^{-1}$.

10. A network as in claim 7 in which the incoming optical data steam has a bit rate of 160 Gbits$^{-1}$.

11. A method of regenerating an optical data signal including
   (a) dividing an incoming optical data signal at a bit rate into a plurality of further data optical streams each having a lower bit rate than the bit rate of the incoming optical signal;
   (b) gating under the control of the plurality of further data streams a clock signal at the frequency of the bit rate of the further data streams or a multiple thereof; and
   (c) interleaving the optical signals produced by step (b) thereby creating a re-generated optical signal at the bit rate of the received optical data signal.

12. A method according to claim 11, in which the step of dividing the optical data signal includes applying the incoming optical data signal to a respective input of each of a plurality of gate means, applying to a respective control input of each of the plurality of gate means an optical clock stream at the frequency of the bit rate of the further data streams or a multiple thereof, and imposing a different respective delay relative to the higher bit rate data signal on each of the said optical clock streams.

13. A method according to claim 11, in which the step of gating the clock signal includes applying each of the said data streams to an array of optical gates, imposing different respective delays between the clock signal and the data signal at each of the gates making up an array, and selecting an optical output from one of the plurality of gates in each array depending on the bit level phase of a received bit-asynchronous optical data signal.

14. A regenerator arranged to implement a method of regenerating an optical data signal according to claim 11, the regenerator including:
   (a) means to divide an incoming optical data signal at a bit rate into a plurality of further data streams each having a lower bit rate than the bit rate of the incoming optical signal;
   (b) means to gate under the control of the plurality of further data streams a clock signal at the frequency of the lower bit rate or a multiple thereof; and
   (c) means to interleave the optical signals produced by means (b) thereby creating a re-generated optical signal at the bit rate of the incoming optical data signal.

15. A method as in claim 11, in which the incoming optical data stream has a bit rate of 160 Gbits$^{-1}$.

* * * * *